(12) United States Patent
Miquilena et al.

(10) Patent No.: US 9,103,202 B2
(45) Date of Patent: Aug. 11, 2015

(54) GELLED FOAM COMPOSITIONS AND METHODS

(71) Applicant: Schlumberger Technology Corporation, Sugar Land, TX (US)

(72) Inventors: Emilio Jose Miquilena, Ciudad del Carmen (MX); Roberto Arangath, Naucalpan de Juarez (MX); Arthur Milne, Quito (EC); Pedro Saldungaray, Reynosa (MX); Richard Donald Hutchins, Sugar Land, TX (US); Syed A. Ali, Sugar Land, TX (US); Baudel William Quintero, Friendswood, TX (US); Leiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/722,853

(22) Filed: Dec. 20, 2012

(65) Prior Publication Data

US 2013/0118748 A1    May 16, 2013

Related U.S. Application Data

(62) Division of application No. 12/823,410, filed on Jun. 25, 2010, now abandoned.

(51) Int. Cl.
*E21B 43/16* (2006.01)
*C09K 8/80* (2006.01)
*C09K 8/504* (2006.01)
*C09K 8/512* (2006.01)
*C09K 8/518* (2006.01)

(52) U.S. Cl.
CPC ............... *E21B 43/16* (2013.01); *C09K 8/5045* (2013.01); *C09K 8/512* (2013.01); *C09K 8/518* (2013.01); *C09K 8/80* (2013.01)

(58) Field of Classification Search
None
See application file for complete search history.

(56) References Cited

U.S. PATENT DOCUMENTS

| 3,311,167 | A |   | 3/1967  | O'Brien et al. |
| 3,330,346 | A |   | 7/1967  | Jacobs et al. |
| 3,734,186 | A | * | 5/1973  | Williams ............... 166/282 |
| 4,612,332 | A |   | 9/1986  | Bock et al. |
| 4,773,481 | A | * | 9/1988  | Allison et al. ............... 166/270 |
| 5,105,884 | A |   | 4/1992  | Sydansk |
| 5,172,763 | A |   | 12/1992 | Mohammadi et al. |
| 5,203,834 | A |   | 4/1993  | Hutchins et al. |

(Continued)

FOREIGN PATENT DOCUMENTS

EP    124367 A2    11/1984

OTHER PUBLICATIONS

Dovan, et al., "New Polymer Technology for Water Controls in Gas Wells", SPE 26653—SPE Annual Technical Conference and Exhibition, Houston, Oct. 3-6, 1993, pp. 280-286.

(Continued)

*Primary Examiner* — John J Figueroa
(74) *Attorney, Agent, or Firm* — Jeremy D. Tillman

(57) ABSTRACT

The invention provides a method made of steps of injecting into a wellbore, a composition comprising a solvent, a surfactant, a foaming gas, a foam enhancer, a crosslinkable polymer, and a crosslinking agent capable of crosslinking the polymer, wherein the foam enhancer increases the foam half-life of the gel composition compared to the gel composition without the foam enhancer; and allowing viscosity of the composition to increase and form a gel.

18 Claims, 1 Drawing Sheet

(56) References Cited

U.S. PATENT DOCUMENTS

| | | | |
|---|---|---|---|
| 5,307,878 | A | 5/1994 | Sydansk |
| 5,322,125 | A | 6/1994 | Sydansk |
| 5,346,008 | A | 9/1994 | Sydansk |
| 5,372,462 | A | 12/1994 | Sydansk |
| 5,462,390 | A | 10/1995 | Sydansk |
| 5,465,792 | A | 11/1995 | Dawson et al. |
| 5,486,312 | A | 1/1996 | Sandiford et al. |
| 5,495,891 | A | 3/1996 | Sydansk |
| 5,513,705 | A | 5/1996 | Djabbarah et al. |
| 5,735,349 | A | 4/1998 | Dawson et al. |
| 5,834,406 | A * | 11/1998 | Sydansk ............... 507/202 |
| 5,869,755 | A * | 2/1999 | Ramamoorthy et al. .. 73/152.05 |
| 6,011,075 | A | 1/2000 | Parris et al. |
| 6,103,772 | A | 8/2000 | Sydansk |
| 6,192,986 | B1 * | 2/2001 | Urlwin-Smith ............... 166/295 |
| 6,268,314 | B1 | 7/2001 | Hughes et al. |
| 6,367,550 | B1 | 4/2002 | Chatterji et al. |
| 7,104,327 | B2 * | 9/2006 | Harris et al. ............... 166/308.5 |
| 2003/0004067 | A1 | 1/2003 | Chatterji et al. |
| 2005/0039919 | A1 * | 2/2005 | Harris et al. ............... 166/308.1 |
| 2006/0086501 | A1 * | 4/2006 | Creel et al. ............... 166/281 |
| 2006/0148660 | A1 | 7/2006 | Chen et al. |
| 2006/0211580 | A1 * | 9/2006 | Wang et al. ............... 507/209 |
| 2008/0066909 | A1 * | 3/2008 | Hutchins et al. ............ 166/280.1 |
| 2008/0156489 | A1 * | 7/2008 | Pershikova et al. ......... 166/280.1 |
| 2008/0289828 | A1 * | 11/2008 | Hutchins et al. ............ 166/308.3 |
| 2011/0265997 | A1 | 11/2011 | Miquilena et al. |
| 2011/0315383 | A1 | 12/2011 | Li et al. |

OTHER PUBLICATIONS

El-Hadidi, et al., "Water Injection Profile Modification in a Layered Reservoir Using Polymer Treatment", SPE 37762—The Middle East Oil Show and Conference, Manama, Bahrain, Mar. 15-18, 1997.

Friedmann, et al., "Development and Testing of a New Foam-Gel Technology to Improve Conformance of the Rangely CO2 Flood", SPE 38837—SPE Annual Technical Conference and Exhibition, San Antonio, Texas, Oct. 5-8, 1997.

Friedmann, et al., "Development and Testing of a Foam-Gel Technology to Improve Conformance of the Rangely CO2 Flood", SPE 54429—SPE Annual Technical Conference and Exhibition, San Antonio, Texas, Oct. 5-8, 1999.

Holm, L.W., "Foam Injection Test in the Siggins Field", Journal of Petroleum Technology, 1970, pp. 1499-1508.

Hughes, et al., "Large Volume Foam-Gel Treatments to Improve Conformance of the Rangely CO2 Flood", SPE 39649—SPE/DOE Eleventh Symposium of Improved Oil Recovery, Tulsa, Oklahoma, Apr. 19-22, 1998.

Lakatos-Szabo, et al., "Restriction of Gas Coning by a Novel Gel/Foam Technique", SPE 39654—SPE/DOE Improved Oil Recovery Symposium, Tulsa, Oklahoma, Apr. 19-22, 1998.

Miller, et al., "A Mechanistic Investigation of Waterflood Diversion Using Foamed Gels", SPE 24662—Annual Technical Conference and Exhibition, Washington, Oct. 4-7, 1992.

Romero, et al., "The Effect of Wettability and Pore Geometry on Foamed Gel Blockage Performance in Gas and Water Producing Zones", SPE 89388—SPE/DOE Fourteenth Symposium on Improved Oil Recovery, Tulsa, Oklahoma, Apr. 17-21, 2004.

Seright, et al., "A Comparison of Different Types of Blocking Agents", SPE 30120—European Formation Damage Conference, The Hague, The Netherlands, May 15-16, 1995.

Sydansk, R.D., "Polymer-Enhanced Foams Part 1: Laboratory Development and Evaluation", SPE 25168—SPE Advanced Technology Series, vol. 2 (2), 1994, pp. 150-159.

Sydansk, R.D., "Polymer-Enhanced Foams Part 2: Propagation Through High-Permeability Sandpacks", SPE 25175—SPE Advanced Technology Series, vol. 2 (2), 1994, pp. 160-166.

Thach, et al., "Matrix Gas Shut-off in Hydraulically Fractured Wells Using Polymer-Foams", SPE 36616—SPE Annual Technical Conference and Exhibition, Denver, Colorado, Oct. 6-9, 1996.

Wassmuth, et al., "Screening and Coreflood Testing of Gel Foams to Control Excessive Gas Production in Oil Wells", SPE 59283—SPE/DOE Improved Oil Recovery Symposium, Tulsa, Oklahoma, Apr. 3-5, 2000.

Wassmuth, et al., "Screening and Coreflood Testing of Gel Foams to Control Excessive Gas Production in Oil Wells", SPE 72096—SPE/DOE Improved Oil Recovery Symposium, Tulsa, Oklahoma, Apr. 3-5, 2000.

Wassmuth, et al., "Water Shut-Off in Gas Wells: Proper Gel Placement is the Key to Success", SPE 89403—SPE/DOE Fourteenth Symposium on Improved Oil Recovery, Tulsa, Oklahoma, Apr. 17-21, 2004.

International Search Report issued in PCT/IB2011/052449 on Dec. 13, 2011, 5 pages.

* cited by examiner

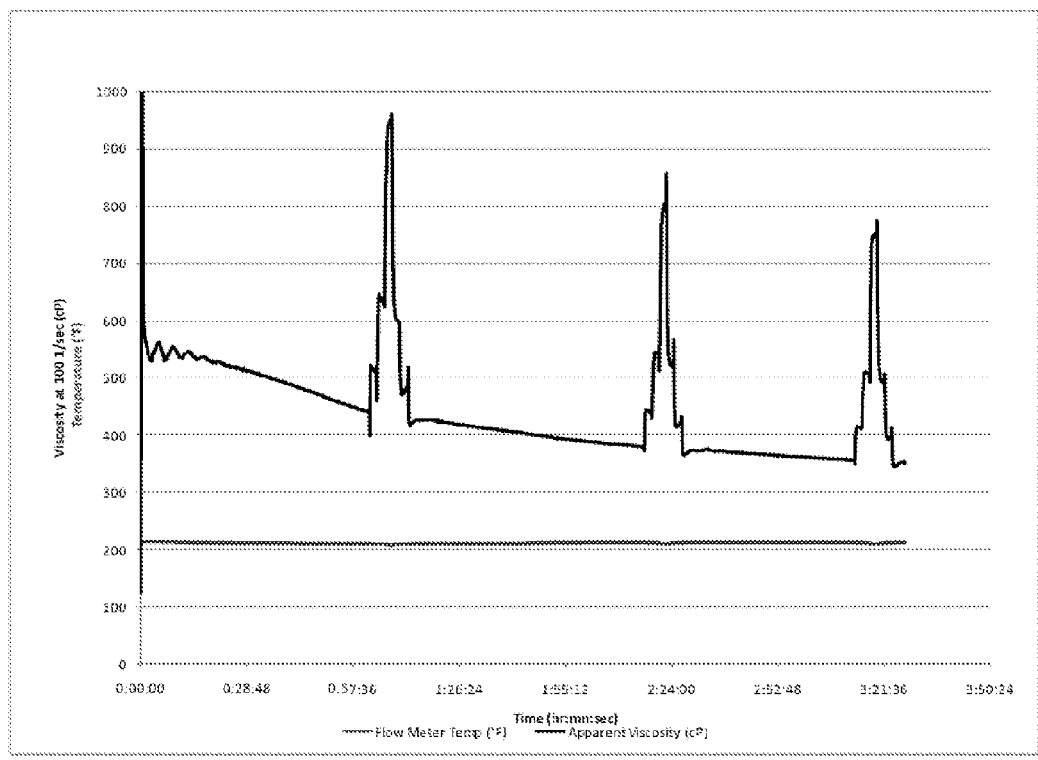

GELLED FOAM COMPOSITIONS AND METHODS

The application claim priority as a divisional application of U.S. patent application Ser. No. 12/823,410 (published as U.S. Patent Application Pub. No. 2011-0315384), which is incorporated by reference herein in its entirety.

FIELD OF THE INVENTION

This invention relates generally to the art of making and using oilfield treatment gels. More particularly it relates to gelled foam fluids made of polymer and methods of using such fluids in a well from which oil and/or gas can be produced.

BACKGROUND

The statements in this section merely provide background information related to the present disclosure and may not constitute prior art.

Water control problems are ubiquitous in oil and gas reservoirs and they have many forms. One difficult problem is that of shutting off fractures or fissures in carbonate reservoirs without impacting the hydrocarbon production. The fissure or fracture tends to dominate flow to a producing well compared to the matrix flow. Commonly, the flow of hydrocarbons may move from the matrix into the fractures and from the fractures into one or more main fractures that intersect the wellbore. Because of the huge flow potential in a sizable opening, any fluid solution must be rather large in volume and able to resist extrusion after the treatment has finished and the well is placed on production. A further complication is the reservoir may contain a range of fissures, fractures and vugs, all of which have the potential to flow. Vugs have both flow potential and large storage capacity, while the capacity of fissures and fractures depend upon the width and the cementation. Since these features cannot be easily mapped, the volumes and geometry of the features are not known, leading to difficulties in designing a plugging treatment.

A similar problem has been encountered in drilling applications where lost circulation zones exist. These features tend to capture the expensive drilling fluid and must be plugged prior to continuing the drilling process. Cementing pipe in hole is subject to these features as well, and poor cementing can result because the cement is diluted by underground rivers or the fluid loss is so high that the cement cannot be propagated throughout the area requiring cement.

Various solutions exist for combating these problems and they generally are referred to as lost circulation material (LCM), lost circulation pills, plugs, gels, cement plugs, formation damage plugs, solids laden plugs, bentonite plugs, fiber plugs, etc. Some solutions include pumping water reactive materials in a non-aqueous fluid (clays and especially bentonite, organic polymers, cement) that tend to set when water is encountered; aqueous fluids that set into stiff gels (crosslinked-water soluble organic polymers, inorganic monomers that gel such as silicates and aluminum compounds, organic monomers that polymerize in situ); non-aqueous fluids such as resins; slurries of solids in aqueous or non-aqueous carrier fluids that plug indiscriminately such as walnut shells, diatomaceous earth or silica flour; and non-compatible waters which precipitate upon meeting in the reservoir.

Polymer gels have been widely used for conformance control of naturally fissured/fractured reservoirs. For an overview of existing polymer compositions, reference is made to the U.S. Pat. Nos. 5,486,312 and 5,203,834 which also list a number of patents and other sources related to gel-forming polymers.

Some of these solutions have been foamed with gas to plug a larger volume with the same amount of chemicals. Foams are often stabilized with polymers which restrict the drainage of the foam boundaries or plateau borders. Foamable gel compositions are described for example in the U.S. Pat. Nos. 5,105,884, 5,203,834, and 5,513,705, wherein the polymer content is reduced at constant volume of the composition.

The typical components of a foamable gel composition are (a) a solvent, (b) a crosslinkable polymer, (c) a crosslinking agent capable of crosslinking the polymer, (d) a surfactant to reduce the surface tension between the solvent and the gas, and (e) the foaming gas, itself.

A new gelled foam having enhanced properties of foam stability is proposed herewith.

SUMMARY

In a first aspect, a composition is disclosed. The composition is for use in a wellbore and consists essentially of a solvent, a surfactant, a foaming gas and a foam enhancer, wherein the foam enhancer by its own increases the viscosity of the composition and the stability of the foam. Also, the composition can be a gel composition for use in a wellbore comprising a solvent, a surfactant, a foaming gas, a foam enhancer, a crosslinkable polymer, and a crosslinking agent capable of crosslinking the polymer, wherein the foam enhancer increases the foam half-life of the gel composition compared to the gel composition without the foam enhancer.

In a second aspect, a method is disclosed. The method comprises injecting into a wellbore, a composition consisting essentially of a solvent, a surfactant, a foaming gas and a foam enhancer; and allowing viscosity of the composition to increase.

In a third aspect, the method comprises injecting into a wellbore, a composition comprising a solvent, a surfactant, a foaming gas, a foam enhancer, a crosslinkable polymer, and a crosslinking agent capable of crosslinking the polymer, wherein the foam enhancer increases the foam half-life of the gel composition compared to the gel composition without the foam enhancer; and allowing viscosity of the composition to increase and form a gel.

BRIEF DESCRIPTION OF THE DRAWINGS

FIG. 1 is a graph showing rheology of foam composition according to the invention versus time.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

As used herewith the term "gel" means a substance selected from the group consisting of (a) colloids in which the dispersed phase has combined with the continuous phase to produce a viscous, jelly-like product, (b) crosslinked polymers, and (c) mixtures thereof.

According to a first embodiment, the gel composition is a composition made from: a solvent, a surfactant also called a foaming agent, a foaming gas and a foam enhancer.

The solvent may be any liquid in which the crosslinkable polymer and crosslinking agent can be dissolved, mixed, suspended or otherwise dispersed to facilitate gel formation. The solvent may be an aqueous liquid such as fresh water or a brine.

Surfactant is used to reduce the surface tension between the solvent and the foaming gas. The surfactants may be water-soluble and have sufficient foaming ability to enable the composition, when traversed by a gas, to foam and, upon curing, form a foamed gel. Typically, the surfactant is used in a concentration of up to about 10, about 0.01 to about 5, about 0.05 to about 3, or about 0.1 to about 2 weight percent.

The surfactant may be substantially any conventional anionic, cationic or nonionic surfactant. Anionic, cationic and nonionic surfactants are well known in general and are commercially available. Preferred foaming agents include those that have good foam formation and stability as measured by half-life. An additional feature is to continue to foam in the presence of hydrocarbons, which are known defoamers. Betaines, mixture of ammonium C6-C10 alcohol/ethoxysulfate 2-Butoxyethanol (EGMBE)/Ethanol and amphoterics such as amphoteric alkyl amine surfactant are good foamers.

Exemplary surfactants include, but are not limited to, alkyl polyethylene oxide sulfates, alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl guanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, trimethyl decenyl ammonium chloride, and dibutyl dihexadecenyl ammonium chloride.

In one embodiment the gel composition comprises a surfactant made of alcohol ether sulfates (AES). Alcohol ether sulfates provide a good foaming performance in acid brines with a broad range of ionic strength and hardness. They allow the liquid phase of the foam to form a strong and robust gel under acid conditions.

The foaming gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), nitrogen, and carbon dioxide. Nitrogen and carbon dioxide are typically readily available in the oil field. Steam could be used for treating high temperature wells; however, the steam may condense and collapse the foam.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected foamable, gel-forming composition). According to one embodiment, the amount of gas injected is about 20 to about 98, and more preferably about 40 to about 95, volume percent based upon the total volume of injected treatment fluids. Foam enhancers are generally formed from water soluble polymers but can also be other organic extenders. Polymers have been used as they increase viscosity in the liquid borders and minimize drainage of the films which lead to bubble collapse. Especially good foam extenders include polymers which have a yield stress behavior at low shear rate such as xanthan and diutan. Other polymers include guar and guar derivatives, welan gum, locust bean gum, polyacrylamides and copolymers containing monomers of acrylamide, acrylic acid, sodium AMPS and vinyl pyrrolidone. Examples include polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Cellulose derivatives are also used in an embodiment, such as hydroxyethylcellulose (HEC) or hydroxypropylcellulose (HPC), carboxymethylhydroxyethylcellulose (CMHEC) and carboxymethycellulose (CMC). Xanthan, diutan, and scleroglucan, three biopolymers, have been shown to have excellent foaming enhancement properties.

According to a second embodiment, the gel composition further comprises a crosslinkable polymer, and a crosslinking agent capable of crosslinking the polymer. The result is a permanent gelation of the foam structure. According a third embodiment, the gel composition further comprises a delay agent to allow delayed crosslinking.

A crosslinked polymer is generally formed by reacting or contacting proper proportions of the crosslinkable polymer with the crosslinking agent. However, the gel-forming composition need only contain either the crosslinkable polymer or the crosslinking agent. When the crosslinkable polymer or crosslinking agent is omitted from the composition, the omitted material is usually introduced into the subterranean formation as a separate slug, either before, after, or simultaneously with the introduction of the gel-forming composition. The composition may comprise at least the crosslinkable polymer or monomers capable of polymerizing to form a crosslinkable polymer (e.g. acrylamide, vinyl acetate, acrylic acid, vinyl alcohol, methacrylamide, sodium AMPS, ethylene oxide, propylene oxide, and vinyl pyrrolidone). In another embodiment, the composition comprises both (a) the crosslinking agent and (b) either (i) the crosslinkable polymer or (ii) the polymerizable monomers capable of forming a crosslinkable polymer.

Typically, the crosslinkable polymer is water soluble. Common classes of water soluble crosslinkable polymers include polyvinyl polymers, polymethacrylamides, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl pyrrolidone, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Other water soluble crosslinkable polymers include hydroxypropyl guar, partially hydrolyzed polyacrylamides, xanthan gum, polyvinyl alcohol, and the ammonium and alkali metal salts thereof.

The crosslinkable polymers are typically synthetic polymers for long term stability but could include biological polymers as well with a biocide.

The crosslinkable polymer is available in several forms such as a water solution or broth, a gel log solution, a dried powder, and a hydrocarbon emulsion or dispersion. As is well known to those skilled in the art, different types of equipment are employed to handle these different forms of crosslinkable polymers.

With respect to the crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, phenyl acetate, resorcinol, glutaraldehyde, catechol, hydroquinone, gallic acid, pyrogallol, phloroglucinol, formaldehyde, and divinylether are some of the more typical organic crosslinking agents. The organic crosslinker can also take the form of a polymer such as polyalkyleneimines such as polyethyleneimine or polyalkylenepolyamines such as polyethylenepolyamines and polypropylenepolyamines as disclosed in U.S. Pat. Nos. 4,773,481 and 6,192,986 incorporated by reference herewith. Typical inorganic crosslinking agents are polyvalent metals, chelated polyvalent metals, and compounds capable of yielding polyvalent metals. Some of the more common inorganic crosslinking agents include chromium salts, aluminates, gallates, dichromates, titanium chelates, aluminum citrate, chromium citrate, chromium acetate, and chromium propionate.

Suitable delay agents vary with the type of polymer and crosslinker employed. Some examples include organic complexing agents such as lactic acid, malonic acid and maleic acids for the metals, ammonium and carbonates salts for the amines, precursors that generate active crosslinkers such as trioxane, hexamethylenetetramine, acetic acid trimer, dioxane, etc.

According to a fourth embodiment, the gel composition further comprises a gelling accelerator or activator.

In some cases the temperature of application is lower than desired to promote crosslinking of the polymer. For example, below about 93° C., hexamethylenetetramine does not thermally degrade into the active crosslinking species quickly enough. In such cases, application of acid to the mixture can force the decomposition of the hexamethylenetetramine and begin the crosslinking reaction and subsequent gelation. However, in some application, as for example in carbonate rocks, some or all of the acid can be lost in reactions with the rock.

The gelling accelerator can be an encapsulated acid to prevent reaction with the rock until the fluid has been placed. The capsule then releases the acid, so most of the acid will be available for interaction with the delayed crosslinker rather than being spent on the rock during flow through the fracture, fissure or fault. Suitable acids include encapsulated acids or acidic salts that reduce pH upon dissolution. Some examples include acetic acid, acetic anhydride, formic acid, hydrochloric acid, fumaric acid, ammonium bisulfite, sodium bisulfate, potassium bisulfate, ammonium sulfate, etc. The chemicals can be encapsulated by various means including sprayed on coatings, fluidized bed coating, pan coating, coating formed by interfacial polymerization, organic coatings used for drug and vitamin delivery such as lipids, etc.

The gelling accelerator can be embodied in or as part of the foaming gas. The gas can be a binary foam defined as a mixture of nitrogen and carbon dioxide. Since carbon dioxide is an acidic gas that interacts with the aqueous medium, the acid functionality can be used to alter the gelation time of the organic crosslinked gel. The crosslinker precursor, hexamethylenetetramine, breaks down into the active crosslinker at a rate that is dependent upon temperature and/or pH. At lower temperatures below about 93° C., the breakdown can be accelerated by applying an acid. Increasing acidic strength speeds up the breakdown and thus, the gelation of the system by crosslinking of the gel. By adjustment of the carbon dioxide content in the gas phase, the gelation time of the foamed gel mixture can be controlled. Since the amount of carbon dioxide available for pH adjustment depends upon the equilibrium conditions of the application (temperature, pressure and partial pressure of carbon dioxide), the design will involve equations of state for prediction of the pH and the subsequent gelation time.

For higher temperature applications, the use of both temperature and pH can accelerate gelation. One example is adding polylactic acid (PLA) solids to the composition. This chemical is largely inert until a certain temperature is reached, at which time the PLA decomposes to provide lactic acid that accelerates the gelation. A similar effect could be achieved by using encapsulated acid or acidic salts that have a capsule wall that does not release until a higher temperature is achieved.

In a fifth embodiment, the gel composition further comprises a gelling enhancer.

The gelling enhancer can be a colloidal solid. Examples include fly ash, silica, fumed silica, titanium dioxide, natural solids such as clays, synthetic clays, talc, calcium carbonate, latexes, nanocarbons, and minerals such as boehmite (Bohmite), carbon black, graphite, etc. Other gelling enhancers for fracture plugging can include solids as fine silica flour, ground nut shells, diatomaceous earth, ground seashells, calcium carbonate, fibers and other minerals. Fibers can be used as synthetic fibers e.g. Kevlar fibers or metal fibers e.g. cast iron fibers.

In a sixth embodiment, the gel composition further comprises a swellable polymer to trap oil and/or water.

If used for removing water, swellable polymers include super absorber polymers based on crosslinked polyacrylates.

If used for trapping oil, swellable polymers include EPDM, EPM, SBR, butyl rubber, neoprene rubber, silicone rubber, and ethylene vinyl acrylate.

Optionally, the liquid components are mixed at the surface and foaming gas is added on the fly just before the combined streams enter the wellbore. Other potential options are to apply some of the gas and liquid phases in separate streams which meet partway or near the bottom of the well. Foam generators are an option for delivering optimal foam properties. The composition gels are compatible with other fluids or material as for example hydrocarbons such as mineral oil, proppants or additives normally found in well stimulation. Current embodiments can be used in various applications including temporary plugs of a formation, kill plugs, or multiple fracturing steps for treating subterranean formations having a plurality of zones of differing permeabilities. However, the primary target is plugging of fractures, fissures and faults within subterranean reservoirs accessed via a wellbore.

To facilitate a better understanding of some embodiments, the following examples of embodiments are given. In no way should the following examples be read to limit, or define, the scope of the embodiments described herewith.

EXAMPLES

Series of experiments were conducted to demonstrate properties of compositions and methods as disclosed above.

In the following tests, various compositions were examined for the ability to foam, the foam volume, foam stability as measured by half-life and foam quality. The half-life is the time for 50 mL to separate and drain from the foam using a loaded volume of 100 mL of liquid. Foam volume is the volume of foam immediately after foaming energy is stopped. The time for the half-life is started at this time as well. Foam quality is the gaseous content of the foam. As can be seen in Table 1, the addition of the foam enhancer vastly improved the foam half-life, but decreased the foam volume and quality. Use of higher molecular weight substituted polyacrylamide polymer (3 million Daltons) lowered the foam volume versus acrylamide sodium acrylate copolymer (0.5 million Daltons). As the gel time might be 2-4 hours, an extender is needed to maintain the foam after pumping is stopped and before the gelation begins.

The polymers were fully hydrated in water prior to adding the other components. Next, 100 mL of the solution was added to a graduated beaker and foamed by operating a Silverson mixer at 4000 rpm for three minutes. A separate study of mixing speed confirmed that 4000 rpm provides the most foam volume and does not shear degrade the polymer viscosity. The foam volume was recorded and the stop watch started after the beaker was removed from the mixer. The acrylamide sodium acrylate copolymer solutions also included 0.21 wt % of hexamethylenetetramine and 0.21 vol % of acetic acid. The substituted polyacrylamide solution also contained 0.2 wt % hexamethylenetetramine, 0.18 vol % phenyl acetate and 0.3 vol % acetic acid. A separate sample of the formulations were heated in capped bottles to 100° C. and good gels were formed, showing none of the components were incompatible. The samples with acrylamide sodium acrylate copolymer and substituted polyacrylamide with guar were stiff and did not move when the bottle was inverted. However, the sample with substituted polyacrylamide alone formed a tonguing gel that extended several inches from the bottle top upon inversion. It was found that cocamidopropyl Betaine/isopropanol/2-Butoxyethanol (EGMBE) mixture was insensitive to oil contamination whereas foams prepared with the other foamers would collapse with oil contamination.

TABLE 1

| Fluid composition | Polymer | Foaming agent | Foam enhancer | Foam Volume, mL | Foam Half-life, minutes | Foam Quality, % |
|---|---|---|---|---|---|---|
| A | 3.1% acrylamide sodium acrylate copolymer | 0.5 vol % ammonium C6-C10 alcohol ethoxysulfate/ethanol/2-Butoxyethanol (EGMBE) mixture | | 650 | 15 | 84.6 |
| B | 3.1% acrylamide sodium acrylate copolymer | 1 vol % ammonium C6-C10 alcohol ethoxysulfate/ethanol/2-Butoxyethanol (EGMBE) mixture | | 1000 | 17 | 90 |
| C | 3.1% acrylamide sodium acrylate copolymer | 2 vol % ammonium C6-C10 alcohol ethoxysulfate/ethanol/2-Butoxyethanol (EGMBE) mixture | | 1220 | 16.1 | 91.8 |
| D | 3.1% acrylamide sodium acrylate copolymer | 0.5 vol % ammonium C6-C10 alcohol ethoxysulfate/ethanol/2-Butoxyethanol (EGMBE) mixture | 0.24% guar | 375 | 82.5 | 73.3 |
| E | 3.1% acrylamide sodium acrylate copolymer | 2 vol % dicoco dimethyl ammonium chloride/ethanol mixture | 0.24% guar | 200 | 55 | 50.0 |
| F | 3.1% acrylamide sodium acrylate copolymer | 5 vol % dicoco dimethyl ammonium chloride/ethanol mixture | 0.24% guar | 300 | 171 | 66.6 |

TABLE 1-continued

| Fluid composition | Polymer | Foaming agent | Foam enhancer | Foam Volume, mL | Foam Half-life, minutes | Foam Quality, % |
|---|---|---|---|---|---|---|
| G | 3.1% acrylamide sodium acrylate copolymer | 10 vol % dicoco dimethyl ammonium chloride/ethanol mixture | 0.24% guar | 300 | 125 | 66.6 |
| H | 3.1% acrylamide sodium acrylate copolymer | 10 vol % dicoco dimethyl ammonium chloride/ethanol mixture + 1 vol % 2-butoxyethanol (EGMBE) | 0.24% guar | 350 | 85 | 71.4 |
| I | 1% substituted polyacrylamide | 0.5 vol % ammonium C6-C10 alcohol ethoxysulfate/ethanol/2-Butoxyethanol (EGMBE) mixture | | 720 | 36.7 | 86 |
| J | 1% substituted polyacrylamide | 0.5 vol % ammonium C6-C10 alcohol ethoxysulfate/ethanol/2-Butoxyethanol (EGMBE) mixture | 0.24% guar | 475 | 100 | 78.9 |
| K | 3.1% acrylamide sodium acrylate copolymer | 1.0 vol % cocamidopropyl Betaine/isopropanol/2-Butoxyethanol (EGMBE) mixture | 0.7 wt % diutan | — | >5 hours | 74.0 |

The fluid composition K in the above table was evaluated further in a circulating foam loop at 100° C. using nitrogen. The hexamethylenetetramine was not included to prevent gelation during the test. The foam was formulated at a quality of 72%. A constant shear rate of 100 s$^{-1}$ was maintained throughout the test except for three shear ramps where the shear rate was reduced to 75, 50 25 and then increased to 50, 75 and 100 s$^{-1}$. Table 2 shows the calculated power law parameters, for the foam versus elapsed time, and includes the $R^2$ or goodness of fit parameter. Clearly the foam maintains its viscosity and its shear thinning properties with only minor changes over the test time of 3.5 hours. The rheology trace is included in FIG. 1. Pictures of the foam segregated in a view cell (data not shown) show that some coarsening of the foam is evident, but the foam has no drainage over the 3.5 hour test time.

TABLE 2

| Elapsed Time, hr:min:sec | Temperature, ° C. | n' | K', lbf-s$^{n'}$/ft$^2$ | $R^2$ |
|---|---|---|---|---|
| 1:14:32 | 100.3 | 0.435 | 0.0120 | 0.977 |
| 2:28:36 | 101.2 | 0.449 | 0.0974 | 0.987 |
| 3:25:40 | 101.3 | 0.456 | 0.0888 | 0.992 |

The fluid composition K was further augmented with 5 vol % of silicate solution (colloidal silica solution). This formulation showed nearly identical properties to the fluid composition K except the gel was visibly stronger and the foamed volume was enhanced. Picture of the formulation (data not shown) shows a stronger gel when put upside down.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope of the embodiments described herewith. Accordingly, the protection sought herein is as set forth in the claims below.

What is claimed is:

1. A method comprising:
   a. injecting into a wellbore, a composition comprising a solvent, a surfactant, a foaming gas, a polysaccharide foam enhancer, a synthetic crosslinkable polymer, and a crosslinking agent capable of crosslinking the polymer, wherein the foam enhancer maintains a foam stability for at least 2-4 hours after injection is stopped and until gelation begins, and
   wherein the crosslinking agent is an inorganic crosslinking agent selected from the group consisting of chromium salts, aluminates and gallates; and
   b. allowing viscosity of the composition to increase and form a gel that plugs at least a portion of the subterranean formation.

2. The method of claim 1 wherein the polysaccharide foam enhancer is a polymer having a yield stress behavior at a low shear rate.

3. The method of claim 1, wherein the solvent is water or brine.

4. The method of claim 1, wherein the surfactant is selected from the group consisting of betaine, ammonium C6-C10 alcohol/ethoxysulfate 2-Butoxyethanol (EGMBE)/Ethanol, amphoteric alkyl amine and mixture thereof.

5. The method of claim 1, wherein the foaming gas is selected from the group consisting of nitrogen, air, carbon dioxide and mixture thereof.

6. The method of claim 1, wherein the polysaccharide foam enhancer is selected from the group consisting of diutan, xanthan, guar, guar derivatives and mixture thereof.

7. The method of claim 1, further comprising a delay agent.

8. The method of claim 1, further comprising a gelling accelerator.

9. The method of claim 8, wherein the surfactant is the gelling accelerator.

10. The method of claim 9, wherein the gelling accelerator is carbon dioxide.

11. The method of claim 1, further comprising a gelling enhancer.

12. The method of claim 11, wherein the gelling enhancer is colloidal solid.

13. The method of claim 11, wherein the gelling enhancer is colloidal silica.

14. The method of claim 11, wherein the gelling enhancer is solid particulate.

15. The method of claim 1, wherein the synthetic crosslinkable polymer comprises acrylamide and acrylate copolymer.

16. The method of claim 1, for treating a subterranean formation.

17. The method of claim 16, for plugging a fracture in the subterranean formation.

18. A method comprising:
 a. injecting into a wellbore, a composition comprising a solvent, a surfactant, a foaming gas, a polysaccharide foam enhancer, a synthetic crosslinkable polymer, and a crosslinking agent capable of crosslinking the polymer, wherein the foam enhancer maintains a foam stability for at least 2-4 hours after injection is stopped and until gelation begins, and
 wherein the crosslinking agent is an organic crosslinking agent; and
 b. allowing viscosity of the composition to increase and form a gel that plugs at least a portion of the subterranean formation.

* * * * *